United States Patent Office 3,485,592
Patented Dec. 23, 1969

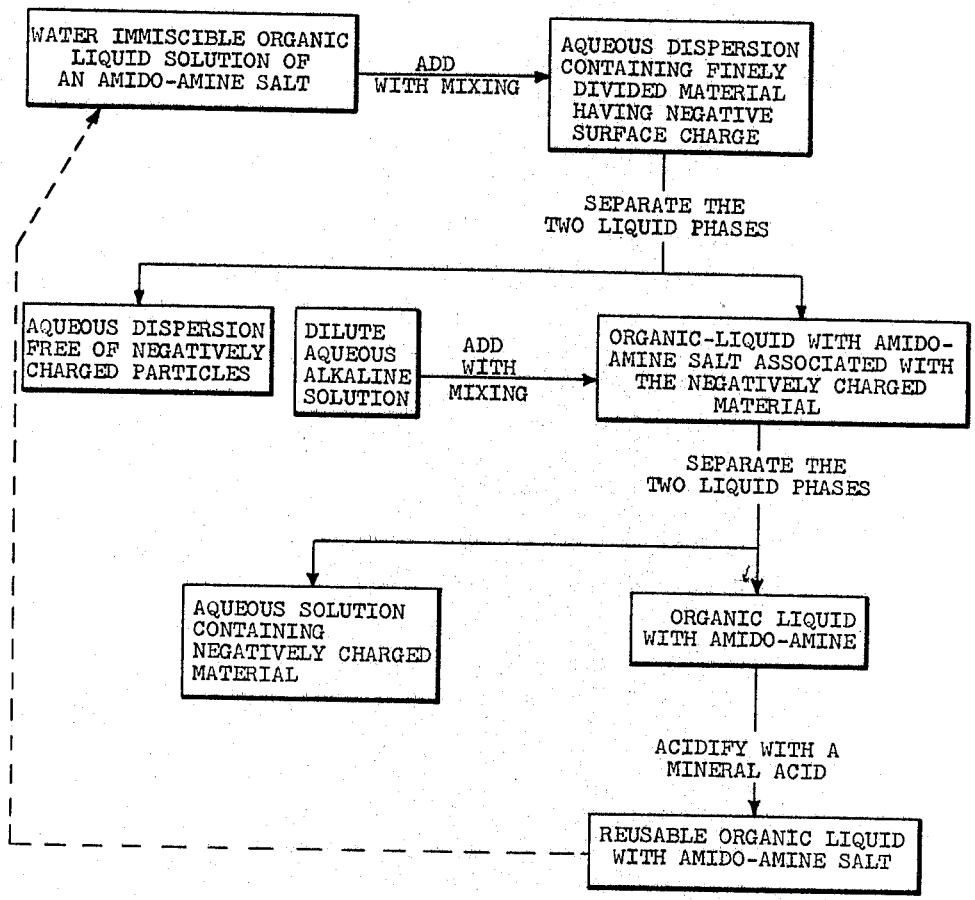

3,485,592
EXTRACTING SILICEOUS MATERIAL FROM AN AQUEOUS DISPERSION WITH AN AMIDO-AMINE MINERAL ACID SALT
Floyd S. Hathaway, El Monte, Calif., assignor to E. I. du Pont de Nemours and Company, Wilmington, Del., a corporation of Delaware
No Drawing. Filed Mar. 26, 1965, Ser. No. 443,085
Int. Cl. B01j 9/04
U.S. Cl. 23—312
6 Claims

ABSTRACT OF THE DISCLOSURE

Particulate material having a negative surface charge is removed from an aqueous dispersion by washing the dispersion with a water immiscible organic liquid solution of a mineral acid salt of an amido-amine. The particulate material is taken up in the organic liquid and a purified aqueous solution is obtained upon separation of the aqueous and organic liquid phases.

---

This invention relates to a method of extraction and is more particularly concerned with a process for transferring negatively charged solid material dispersed in water from the aqueous phase into an organic liquid phase.

According to this invention, an aqueous dispersion of a material in finely divided form and carrying a negative surface charge is treated with an organic liquid solution of an amido-amine salt. The dispersed material is attracted to the organic phase by the positively charged amido-amine salt. Subsequently the negatively charged material is transferred from the organic liquid by washing with a dilute aqueous alkaline solution. The negatively charged material is thereby transferred from the organic phase into the alkaline aqueous phase. The phases are then separated and the organic phase can be reused to treat additional amounts of the aqueous dispersion of the negatively charged material.

The amido-amine salts used in the process of this invention are in general known materials, which are prepared by reacting an amine material with less than a stoichiometric amount of a fatty acid under conditions to effect amidation and reacting the amido-amine so produced with sufficient acid to neutralize the remaining free amino groups. The amine reactant employed in preparing the amido-amine salt is in general an aliphatic polyamine, particularly an alkylene polyamine containing at least 2 primary amino nitrogen atoms. Examples of alkylene polyamine suitable for the preparation of the salts used in this invention are ethylenediamine, propylenediamine, diethylenetriamine, diamylenetriamine, triethylenetetramine, tripropylenetetramine, diethylenepropylenetetramine, tetraethylenpentamine, tetrabutylenepentamine, diethylenedipropylenepentamine, butylenediamine, dihexylenetriamine and the like or mixtures thereof. Such amine reactants can be described by the formula:

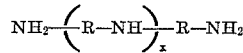

where

R represents alkylene of 1 to 12 carbon atoms and
x represents an integer of 0 to 20.

Other suitable polyamines include those having the general formula:

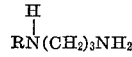

where R represents a $C_{10}$ to $C_{18}$ aliphatic chain. These polyamines are obtained by condensing the suitable amine with acrylonitrile and hydrogenating to the corresponding diamine. Commercially available polyamines of this type are those marketed as "Duomeens" which are prepared by the condensation of dodecylamine or an octadecylamine with acrylonitrile followed by hydrogenation to the corresponding diamine product. These products are marketed as Duomeen-C and Duomeen-T respectively.

A particularly preferred aliphatic polyamine, for use because of its effectiveness in the process and also because of its ready availability and low cost, is a commercial product obtained as a residue in the manufacture of hexamethylenediamine and sold as Amine–248.

The major component of Amine–248 is dihexamethylenetriamine. Approximately 75% of Amine–248 consists of dihexamethylenetriamine and higher homologues thereof which can be represented as:

$$H_2N[(CH_2)_6NH]_{2+n}H$$

where $n$ is an integer of 1 to about 4.

The remaining 25% of the product comprises lower molecular weight nitrogen compounds including hexamethylenediamine, $C_9$–$C_{10}$ diamines, ε-aminocapronitrile, ε-caprolactam, hexamethyleneimine, 2-cyanocyclopentylidenimine, and adiponitrile. Since there is some variation in the distribution of these components, the physical properties of the product may vary slightly. However, a typical material will have a viscosity range of 100–3,000 centipoises, a density of about 8.3 lb./gal. at 27° C., a freezing range of about 5–20° C., and a flash point of about 370° F., Cleveland Open Cup. Less than 25% of a typical material distills below 184° C. at 10 mm. Hg. It is miscible in water, acetone, methanol and benzene at 27–28° C. and it contains about 8 to 10 milliequivalents of amine per gram.

The carboxylic acid reacted with the amine material to form the amido-amine can be any of the well known class of fatty acids containing sufficient number of carbon atoms in the hydrocarbon chain to make it compatible with the organic liquid phase. Thus the hydrocarbon chain of the fatty acid should contain at least 2 carbon atoms. There is actually no upper limit to the number of carbon atoms which it may contain although as a practical matter acids containing more than about 30 carbon atoms would not be used. The preferred acids will be those containing about 12 to 22 carbon atoms in the hydrocarbon chain.

To make the amido-amines there will ordinarily be used a ratio of fatty acid to polyamine material of about 0.3:1 up to as much as 2:1 parts by weight. The preferred range will be about 0.6:1 to about 0.9:1. The reaction is carried out according to conventional amidation procedures by heating the fatty acid and the amine material together for a period of several hours at a temperature in the range of about 150 to 180° C. At the end of the reaction the free unreacted amine groups in the amido amine material should be in the range of 3 to 6 milliequivalents per gram when determined by titrating a sample of the reaction product dissolved in isopropyl alcohol with standard HCl to a pH of 4.5.

The amido-amine salt is then made by reacting the amido-amine with a mineral acid according to conventional procedures known in the art. The amount of acid used to neutralize the free amine groups should be that required to bring the pH of a water solution of the amido-amine salt to a range of about 4 to 7 and preferably about 6. Thus to neutralize an amido-amine product for use in this invention with hydrochloric acid, there should be used an amount of the acid in the range of about 0.1 to about 0.22 part of the acid per part of amido-amine.

The proper amount of a given acid which will be required to provide a product having any desired pH will be readily apparent to those skilled in the art. The preferred procedure for making the amine salt is to add the amido-amine to hot water at about 125° F. containing about half the acid required to neutralize the free amine group in the amido-amine. When the amido-amine is added to the water it disperses rapidly, first making a cloudy solution as the amido-amine itself is dispersed and then going into solution as it is slowly neutralized by the acid in the water. At this point the pH of the solution will be about 8 to 7. The remaining acid is then carefully added to the water solution with stirring, continually taking out samples to check the pH and acidification is continued until the pH is about 6.

Any mineral acid is suitable to neutralize the amido-amine for use according to this invention. The preferred acids, of course, are those which are most readily and economically available such as hydrochloric acid, sulfuric acid, phosphoric acid and sulfamic acid.

In practicing the process of this invention then the amido-amine salt obtained as above, is dissolved in an organic liquid solvent. Any organic liquid which is immiscible with water and in which the amido-amine salt is soluble will be suitable for this invention and again the choice will be governed by consideration of cost and availability. Thus, the preferred solvents for use in the invention will be petroleum distillates such as kerosene and naphtha.

The amount of the amido-amine salt to be dissolved in the organic liquid is not in any way critical. The concentration, of course, will depend upon the solubility of the amido-amine salt in the organic liquid and will also depend upon the solubility of the complex formed by the association of the amido-amine salt with the negatively charged material transferred from the aqueous phase. In addition, it will depend upon the ratio of the volumes of the organic phase and aqueous phase used, a lower concentration of the amido-amine salt being required where larger volumes of the organic phase are used. The amount of organic liquid used to wash the aqueous dispersion should of course be sufficient to provide adequate contact with the negatively charged dispersed material so there will generally be used at least about 0.3 volume of organic liquid per volume of aqueous dispersion. No advantage is gained in using a great excess of organic liquid so normally no more than about 1 volume of organic liquid will be used per volume of aqueous phase. Ordinarily about equal volumes of organic and aqueous phase will be used in the process, and in this instance the concentration of the amido-amine salt in the organic liquid will in general range from about 0.2 to 3.0% by weight based on the weight of the liquid.

As an alternative the amido-amine itself may be dissolved in the organic phase. The aqueous dispersion is acidified with a mineral acid. On initially mixing the two phases, the mineral acid will form in the organic phase the salt of the amido-amine, which at the same time will extract the negatively charged dispersed material from the aqueous phase into the organic phase.

After the aqueous dispersion is washed with the organic liquid containing the amido-amine salt, the phases are allowed to separate and the organic liquid phase is withdrawn for further treatment. The negatively charged material is freed from the organic phase by washing the organic phase with a dilute aqueous alkaline solution. Any alkali may be used to wash the organic phase. However as a practical matter, it is preferred to used caustic soda. The amount of alkali used, of course, should be just sufficient to hydrolyze the amido-amine salt and free the negatively charged material from the organic phase. The amount will be readily determined for a given instance by those skilled in the art.

The process of this invention is carried out according to conventional extraction procedure. Thus, for example, on laboratory scale, the aqueous dispersion and organic liquid may be added in about equal volumes to a separatory funnel and the funnel then shaken vigorously to provide intimate contact of the phases. The phases are then allowed to separate and the aqueous phase is drawn off the bottom. The organic phase now containing the negatively charged material associated with the amido-amine salt remains in the funnel and to the funnel is added an approximately equal volume of the dilute aqueous alkaline solution. The funnel is again shaken vigorously and the phases are allowed to separate. The aqueous alkaline phase will then be drawn off the bottom of the funnel and will be found to contain negatively charged material and the water soluble inorganic hydrolysis products. The organic phase containing the amido-amine can then be acidified with a mineral acid to reform the amido-amine salt and reused in the process. Of course, the same procedure can be carried out in plant scale equipment and multiple batch extractions can also be used to increase the efficiency of the process.

If desired the process can be carried out on a commercial scale in extraction columns with counter-current flow. Thus, for example, the organic liquid contained in the amido-amine salt can be introduced into the bottom of a column and the aqueous dispersion can be introduced continuously into the top of the column. The aqueous phase substantially free of the negatively charged material then can be withdrawn from the bottom of the column and the effluent from the top of the column will consist of the organic phase containing the amido-amine salt associated with the negatively charged material. This overhead effluent will then be introduced into the bottom of a second column with counter-current flow with a dilute aqueous alkaline solution being introduced at the top. The negatively charged material will thus be transferred back into an aqueous phase which will exit from the bottom of the column. The overhead effluent will consist of the organic liquid containing the amido-amine which can then be acidified and re-cycled to the bottom of the first column.

The process of this invention is useful for extracting negatively charged impurities such as siliceous materials from ores. The beneficiation of ores in the past has been accomplished primarily with flotation processes. In the past few years, however, there has been a considerable increase in the use of solvent extraction methods for mineral processing. Solvent extraction has been found to be particularly suitable for obtaining metals of high purity from low grade ores. It has been used successfully on commercial scale for the recovery of uranium, vanadium, tungsten, thorium and boron and has been used on pilot scale and in laboratories for the recovery of many other metals.

Two basic types of solvent extraction processes are used in the industry. In both of these processes the ore is finely crushed and is dispersed in water. The dispersion is then treated with an organic solvent. In one process the entire organic phase acts as a solvent for some components of the aqueous phase which is soluble in both water and in the organic. In the second method, a small quantity of an organic chemical is dissolved in a second organic compound called the diluent. The diluent may be a material such as kerosene or some other inert hydrocarbon but its essential function is to serve as a carrier for the active component. During the extraction process the dissolved component reacts chemically with some component of the dispersed ore which it is desired to remove.

The process of this invention is particularly suitable for adaptation to the latter method. Thus, for example, an ore containing an impurity which carries a negative surface charge such as a clay, can be finely ground and dispersed in water according to conventional techniques. The dispersion can then be treated with an organic liquid such as kerosene or other hydrocarbon having dissolved therein a small amount of the amido-amine salt which has been described above. The amido-amine salt is of course the active component in the liquid phase and serves to attract the negatively charged impurities in the aqueous dispersion thereby transferring the clay from the dispersion to the organic phase, leaving in the aqueous phase the desired mineral. The organic phase can then be freed of the clay by washing with a dilute aqueous alkali as described above. This operation can be carried out using procedures and apparatus conventional in the art and the process of the invention can be readily adapted by those skilled in the art to this use.

The process of the invention will be further described by the following illustrative example.

EXAMPLE

Two grams of kaolinite having an average particle diameter of 0.2 micron were dispersed in 250 milliliters of water. In another container, 0.8 gram of amido-amine hydrochloride made from Amine–248 and tall oil acid were dissolved in 250 milliliters of kerosene. The two components were then mixed and placed in a separatory funnel and shaken thoroughly. The resulting mixture was then allowed to separate into two layers. The aqueous layer was drawn off the bottom of the separatory funnel and was discarded. It was found that the clay had transferred from the aqueous into the kerosense layer. The kerosene layer was then mixed with a fresh alkaline water solution. This mixture was placed in a separatory funnel, shaken vigorously and allowed to separate into layers. Upon analysis it was found that the clay had now transferred from the kerosene into the aqueous layer.

The amido-amine hydrochloride used in the above example was prepared as follows: One hundred parts of Amine–248 were heated to a temperature of 35° C. and added to 58 parts of a tall oil (Indusoil M28, W. Va. Pulp & Paper Co.) and this mixture was cooked for 8 hours at a temperature of about 160° C. At the end of this time a sample of the amido-amine product was titrated with standard HCl to a pH of 4.5 and was found to contain 4.84 milliequivalents per gram of free amine. From this titration it was determined that the amount of hydrochloric acid necessary to neutralize the free amine groups still remaining in 128.7 grams of the amido-amine product would be approximately 70.6 grams of 20° Baumè hydrochloric acid. This amount of hydrochloric acid was weighed out into a beaker and about half of the amount required was added to a vessel containing additional water heated to a temperature of 125° F. The 128.7 grams of amido-amine product was then poured into the acidified water with vigorous stirring. When the amido-amine had completely dissolved, additional acid was added an acidification was continued until the pH had reached a level of 6.2. The water solution of the amido-amine hydrochloride was then evaporated to dryness and the salt was ready for use as described above.

The invention claimed is:

1. A process for extracting siliceous solid material carrying a negative surface charge from an aqueous dispersion thereof which comprises washing said aqueous dispersion with a water immiscible organic liquid solution of an amido-amine mineral acid salt and thereby recovering said siliceous material in said organic liquid.

2. A process for extracting siliceous solid material carrying a negative surface charge from an aqueous dispersion thereof which comprises washing said aqueous dispersion with a water immiscible organic liquid solution of a mineral acid salt of an amido-amine derivative of an aliphatic polyamine and a fatty acid containing at least 2 carbon atoms and thereby recovering said siliceous material in said organic liquid.

3. A process as defined in claim 2 wherein the aliphatic polyamine is a member of the group consisting of compounds of the formula:

where R represents alkylene of 1 to 12 carbon atoms and $x$ represents an integer of from 0 to 20.

4. A process as defined in claim 2 wherein the aliphatic polyamine is an amine residue consisting essentially of
  (a) about 75% by weight dihexamethylenetriamine and higher homologues thereof which can be represented by the formula:

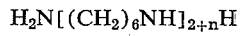

where $n$ is an integer of 1 to about 4, and
  (b) about 25% of lower molecular weight nitrogen compounds which includes a mixture of hexamethylenediamine, $C_9$–$C_{10}$ diamines, ε-aminocapronitrile, ε-caprolactam, hexamethyleneimine, 2 - cyanocyclopentylidenimine, and adiponitrile.

5. A process as defined in claim 1 followed by the step of washing the organic liquid phase containing the negatively charged solid associated with the amido-amine salt with a dilute aqueous alkaline solution, whereby the negatively charged material is transferred from the organic phase back into an aqueous phase.

6. A process as defined in claim 2 wherein the aliphatic polyamine is

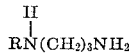

where R represents a $C_{10}$ to $C_{18}$ aliphatic chain.

References Cited

UNITED STATES PATENTS

| | | | |
|---|---|---|---|
| 2,922,707 | 1/1960 | Lindstrom et al. | 260—404.5 |
| 2,970,160 | 1/1961 | Walker | 260—404.5 |
| 3,192,012 | 6/1965 | Rice. | |
| 3,197,274 | 7/1965 | White | 23—312 |
| 3,088,799 | 5/1963 | Fetscher. | |
| 3,266,888 | 8/1966 | Goren | 23—312 |

WILBUR L. BASCOMB, JR., Primary Examiner

U.S. Cl. X.R.

23—340; 209—5; 210—21